United States Patent
Takaoki et al.

(10) Patent No.: US 6,528,596 B2
(45) Date of Patent: Mar. 4, 2003

(54) MODIFIED PARTICLES, CATALYST FOR OLEFIN POLYMERIZATION, AND PROCESS OF PRODUCING OLEFIN POLYMER

(75) Inventors: Kazuo Takaoki, Ichihara (JP); Tatsuya Miyatake, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 116 days.

(21) Appl. No.: 09/742,385

(22) Filed: Dec. 22, 2000

(65) Prior Publication Data
US 2001/0007007 A1 Jul. 5, 2001

(30) Foreign Application Priority Data

Dec. 27, 1999 (JP) ............. 11-370680
Dec. 27, 1999 (JP) ............. 11-370681
Dec. 27, 1999 (JP) ............. 11-370682
Dec. 27, 1999 (JP) ............. 11-370683

(51) Int. Cl.$^7$ .............. C08F 4/58; C08F 4/60; C08F 4/606; C08F 4/626; C08F 4/64
(52) U.S. Cl. ............ 526/113; 526/114; 526/115; 526/117; 526/118; 526/160; 526/166; 502/103; 502/113; 502/117; 502/129; 502/130; 502/131
(58) Field of Search .............. 502/103, 113, 502/117, 129, 130, 131; 526/113, 114, 115, 117, 118, 160, 166

(56) References Cited

U.S. PATENT DOCUMENTS

| 4,356,316 | A | * | 10/1982 | Aoshima et al. ............ 560/208 |
| 4,717,708 | A | | 1/1988 | Cheng et al. |
| 6,100,213 | A | | 8/2000 | Kumamoto et al. |
| 6,180,830 | B1 | * | 1/2001 | Jacquot ................. 568/435 |
| 6,284,699 | B1 | | 9/2001 | Ohgane et al. |
| 6,388,017 | B1 | * | 5/2002 | McDaniel et al. .......... 525/240 |

FOREIGN PATENT DOCUMENTS

| DE | 19711304 A1 | 10/1997 |
| EP | 0949273 A | 10/1999 |
| GB | 969761 | 9/1964 |
| GB | 1348702 | 3/1974 |
| JP | 11269213 A | 10/1999 |
| WO | WO 9736937 | 10/1997 |

* cited by examiner

Primary Examiner—David W. Wu
Assistant Examiner—R. Rabago
(74) Attorney, Agent, or Firm—Birch, Stewart, Kolasch & Birch, LLP

(57) ABSTRACT

A modified particles obtained by contacting particles(a) with a metal compound(b) selected from the group consisting of compounds of the Group VI, VII, XIV metal elements and compounds of the lanthanide series, and contacting the particles with a compound(c) having a functional group containing active hydrogen or a non-proton donative Lewis basic functional group and an electron-withdrawing group; a carrier composed of the modified particles; a catalyst component for olefin polymerization composed of said modified particles; a catalyst for olefin polymerization obtained by contacting the modified particles(A) and a transition metal compound(B), or further an organometallic compound(C); and a process for producing an olefin polymer with the catalyst.

16 Claims, No Drawings

MODIFIED PARTICLES, CATALYST FOR OLEFIN POLYMERIZATION, AND PROCESS OF PRODUCING OLEFIN POLYMER

BACKGROUND OF THE INVENTION

1. Field of the Invention

The present invention relates to particles suited for use as a carrier and a catalyst component for olefin polymerization, a catalyst for olefin polymerization using the same, and a process for producing an olefin polymer using said catalyst for olefin polymerization.

2. Description of Related Arts

Olefin polymers such as polypropylene and polyethylene have widely been used in the fields of various moldings because of excellent mechanical properties and chemical resistance as well as good balance between the properties and economical efficiency. These olefin polymers have hitherto been produced by polymerizing an olefin using mainly a so-called Ziegler-Natta catalyst (multi-site catalyst) obtained by combining a solid catalyst component obtained from a compound of the Group IV metal elements (e.g. titanium trichloride, titanium tetrachloride, etc.) with a compound of the Group XIII metal elements represented by an organoaluminum compound.

There has recently been proposed a process for producing an olefin polymer, which comprises polymerizing an olefin using a so-called single-site catalyst obtained by combining a transition metal compound (e.g. metallocene complex, non-metallocene compound, etc.) different from the solid catalyst component, which has been used for a long time, with aluminoxane. For example, JP-A-58-19309 reports a method of using bis(cyclopentadienyl)zirconium dichloride and methyl aluminoxane. It has also been reported to combine a specific boron compound with such a transition metal compound. For example, JP-A-1-502036 reports a method of using bis(cyclopentadienyl)zirconium dimethyl and tri(n-butyl)ammoniumtetrakis(pentafluorophenyl)borate. It has been known that an olefin polymer obtained by using the single-site catalyst has a narrow molecular weight distribution as compared with that obtained by using a conventional solid catalyst (multi-site catalyst) and a homogeneous olefin polymer is obtained as compared with the case of using a conventional solid catalyst because a comonomer is copolymerized more uniformly in case of a copolymer.

Since the catalyst obtained from the metallocene complex and non-metallocene compound is usually soluble in a reaction system, when using it in the polymerization which forms polymer particles (e.g. slurry polymerization, gas phase polymerization, etc.), the resulting polymer is unstable in shape to cause formation of coarse polymer particles, agglomerate polymer and finely powdered polymer, reduction of the bulk density of a polymer, and adhesion of a polymer to a polymerization reactor wall. For these reasons, there were problems that poor heat transfer, poor heat removal in the reactor and the like were caused, and difficulty in a stable operation and reduction of productivity resulted.

JP-A-11-193306 has been known as a method of solving such a problem, but a further improvement has been required in view of the molecular weight of the resulting polymer.

Furthermore, these metallocene catalysts have such a drawback that properties of the copolymer obtained by a change of a monomer ratio in the polymerization (e.g. density, melting point, etc.) are liable to change because of a large number of short chain branches (SCB) in the production of the copolymer.

SUMMARY OF THE INVENTION

An object of the present invention is to provide particles which can provide high-molecular polymer excellent in shape and particle properties with a high activity when a transition metal compound is applied to the olefin polymerization accompanied with formation of olefin polymer particles (e.g. slurry polymerization, gas phase polymerization, etc.) by using in combination with the transition metal compound, and which can particularly provide a copolymer containing a relatively small number of short chain branches in the production of an ethylene copolymer; a carrier composed of said particles; a catalyst component for olefin polymerization using said particles; a catalyst for olefin polymerization using said particles; and a process for producing olefin polymer using said catalyst for olefin polymerization.

That is, the present invention provides modified articles obtained by contacting particles (a) with a metal compound (b) selected from the group consisting of compounds of the Group VI metal elements, compounds of the Group VII metal elements, compounds of the Group XIV metal elements and compounds of the lanthanide series of the Periodic Table, and contacting said particles with a compound (c) having a functional group containing an active hydrogen or a non-proton donative Lewis basic functional group and an electron-withdrawing group.

The present invention also provides a carrier composed of said modified particles; a catalyst component for olefin polymerization comprising said modified particles; a catalyst for olefin polymerization obtained by contacting said modified particles (A) with a transition metal compound (B) and optionally an organometallic compound (C); and a process for producing olefin polymer with said catalyst for olefin polymerization.

The present invention will be described below in detail.

DETAILED DESCRIPTION OF THE INVENTION (a) Particles

Modified articles of the present invention are obtained by contacting particles (a) with a metal compound (b) selected from the group consisting of compounds of the Group VI metal elements, compounds of the Group VII metal elements, compounds of the Group XIV metal elements and compounds of the lanthanide series, and contacting said particles with a compound (c) having a functional group containing active hydrogen or a non-proton donative Lewis basic functional group and an electron-withdrawing group.

The particles (A) are preferably those that are generally used as a carrier. Porous materials having a uniform particle diameter are preferred. Inorganic materials or organic polymers are preferably used.

Examples of the inorganic material used in the particles (A) of the present invention include inorganic oxides, magnesium compounds and the like. Clay and clay minerals can be used as far as they do not cause any problems. They can be used alone or in combination.

Examples of the inorganic oxide are $SiO_2$, $Al_2O_3$, $MgO$, $ZrO_2$, $TiO_2$, $B_2O_3$, $CaO$, $ZnO$, $BaO$, $ThO_2$, and mixtures thereof such as $SiO_2$—$MgO$, $SiO_2$—$Al_2O_3$, $SiO_2$—$TiO_2$, $SiO_2$—$V_2O_5$, $SiO_2$—$Cr_2O_3$, and $SiO_2$—$TiO_2$—$MgO$. Among these inorganic oxides, $SiO_2$ and/or $Al_2O_3$ are preferred. Furthermore, the inorganic oxide may contain a small amount of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and $Li_2O$.

Examples of the magnesium compound are magnesium halide such as magnesium chloride, magnesium bromide, magnesium iodide, or magnesium fluoride; alkoxy magnesium halide such as methoxy magnesium chloride, ethoxy magnesium chloride, isopropoxy magnesium chloride, butoxy magnesium chloride, or octoxy magnesium chloride; aryloxy magnesium halide such as phenoxy magnesium chloride or methyl phenoxy magnesium chloride; alkoxy magnesium such as ethoxy magnesium, isopropoxy magnesium, butoxy magnesium, n-octoxy magnesium, or 2-ethyl hexoxy magnesium; aryloxy magnesium such as phenoxy magnesium or dimethyl phenoxy magnesium; or carboxylates of magnesium such as magnesium laurate or magnesium stearate. Among these magnesium compounds, magnesium halide or alkoxy magnesium are preferred, and magnesium chloride or butoxy magnesium are more preferred.

Examples of the clay or clay mineral include kaolin, bentonite, kibushi clay, allophane, hisingerite, pyrophyllite, talc, mica group, montmorillonite group, vermiculite, chlorite group, palygorskite, kaolinite, nacrite, dickite, smectite, saponite, andhalloysite. Among these clays and clay minerals, montmorillonite and saponite are preferred, and montmorillonite and hectorite are more preferred.

It is not necessary for these inorganic materials to remove water when used, but inorganic materials dried by a heat treatment are preferably used. The heat treatment is carried out at a temperature within a range from 100 to 1,500° C., preferably from 100 to 1,000° C., and more preferably from 200 to 800° C. Examples of the method include, but are not limited to, a method of heating and passing a dry inert gas (e.g. nitrogen, argon, etc.) through at a constant rate for several hours or more, or heating and evacuating for several hours.

The average particle diameter of the inorganic material is preferably within a range from 5 to 1000 $\mu m$, more preferably from 10 to 500 $\mu l$, and further preferably from 10 to 100 $\mu l$. The pore volume is preferably 0.1 mg/g or more, and more preferably within a range from 0.3 to 10 ml/g. The specific surface area is within a range from 10 to 1000 $m^2/g$, and more preferably from 100 to 500 $m^2/g$.

The organic polymer used in the particles (A) of the present invention may be any organic polymer. A mixture of plural kinds of organic polymers may be also used. The organic polymer is preferably an organic polymer having a functional group capable of reacting with compounds of lanthanide series (b). Such a functional group includes a functional group containing active hydrogen, or a non-proton donative Lewis basic functional group. The organic polymer, which can be used in the particles (A), is preferably a polymer having a functional group containing active hydrogen or a non-proton donative Lewis basic functional group.

The functional group containing active hydrogen is not limited as far as it contains active hydrogen. Specific examples thereof include primary amino, secondary amino, imino, amido, hydrazide, amidino, hydroxy, hydroperoxy, carboxyl, formyl, carbamoyl, sulfonic acid, sulfinic acid, sulfenic, thiol, thioformyl, pyrrolyl, imidazolyl, piperidyl, indazolyl, and carbazolyl groups. Preferred are primaryamino, secondary amino, imino, amido, imido, hydroxy, formyl, carboxyl, sulfonic acid, and thiol groups. Particularly preferred are primary amino, secondary amino, amido, and hydroxy groups. These groups may be substituted with a halogen atom or a hydrocarbon group having 1 to 20 carbon atoms.

The non-proton donative Lewis basic functional group is not limited as far as it is a functional group having a Lewis basic moiety containing no active hydrogen atom. Examples thereof include pyridyl, N-substituted imidazolyl, N-substituted indazolyl, nitrile, azide, N-substituted imino, N,N-substituted amino, N,N-substituted aminooxy, N,N,N-substituted hydrazino, nitroso, nitro, nitrooxy, furyl, carbonyl, thiocarbonyl, alkoxy, alkyloxycarbonyl, N,N-substituted carbamoyl, thioalkoxy, substituted sulfinyl, substituted sulfonyl, and substituted sulfonic acid group groups. Preferred is a heterocyclic group. More preferred is an aromatic heterocyclic group having an oxygen and/or a nitrogen atom in the ring. Particularly preferred are pyridyl, N-substituted imidazolyl, and N-substituted indazolyl groups. Most preferred is a pyridyl group. Furthermore, these groups may be substituted with a halogen atom or a hydrocarbon group having 1 to 20 carbon atoms.

The amount of the functional group containing active hydrogen or a non-proton donative Lewis basic functional group is not limited, but the mole amount of a functional group per unit gram of the polymer is preferably within a range from 0.01 to 50 mmol/g, and more preferably from 0.1 to 20 mmol/g.

A polymer containing such a functional group can be obtained, for example, by homopolymerization of a monomer having a functional group containing active hydrogen or a non-proton donative Lewis basic functional group and one or more polymerizable unsaturated groups, or copolymerization of the same with other monomer containing one or more polymerizable unsaturated groups. It is preferred that a cross-linking polymerizable monomer containing two or more polymerizable unsaturated groups is copolymerized simultaneously.

The monomer having a functional group containing active hydrogen or a non-proton donative Lewis basic functional group and one or more polymerizable unsaturated groups includes a monomer having the functional group containing active hydrogen and one or more polymerizable unsaturated group, or a monomer having a functional group containing Lewis basic moiety but no active hydrogen and one or more polymerizable unsaturated groups. Examples of the polymerizable unsaturated group include alkenyl groups such as vinyl and allyl group; and alkynyl groups such as an ethyne group.

Examples of the monomer having a functional group containing active hydrogen and one or more polymerizable unsaturated groups include primary amine containing a vinyl group, secondary amine containing a vinyl group, amide compound containing a vinyl group, and hydroxy compound containing a vinyl group. Specific examples thereof include N-(1-ethenyl)amine, N-(2-propenyl)amine, N-(1-ethenyl)N-methylamine, N-(2-propenyl)-N-methylamine, 1-ethenyl) amide, 2-propenyl)amide, N-methyl-(1-ethenyl)amide, N-methyl-(2-propenyl)amide, vinyl alcohol, 2-propen-1-ol, and 3-buten-1-ol.

Examples of the monomer having a functional group containing Lewis basic moiety, but no active hydrogen, and one or more polymerizable unsaturated groups include vinylpyridine, vinyl(N-substituted)imidazol, and vinyl(N-substituted)indazol.

Other monomer having one or more polymerizable unsaturated groups includes, for example, ethylene, α-olefin, or aromatic vinyl compound. Examples thereof include ethylene, propylene, butene-1, hexene-1, 4-methyl-pentene- 1, and styrene. Preferred are ethylene and styrene. These monomers may be used in combination.

Examples of the cross-linking polymerizable monomer having two or more polymerizable unsaturated groups include divinylbenzene.

The average particle diameter of the organic polymer is preferably within a range from 5 to 1000 μm, and more preferably from 10 to 500 μm. The pore volume is preferably 0.1 ml/g or more, and more preferably within a range from 0.3 to 10 ml/g. The specific surface area is preferably within a range from 10 to 1000 m²/g, and more preferably from 50 to 500 m²/g.

(b) Metal Compounds

The metal compound (b), which can be used in the present invention, is a metal compound selected from the group consisting of compounds of the Group VI elements, the Group VII elements, the Group XIV elements and the lanthanide series. The compounds of the Groups VI, VII and XIV metal elements and compounds of the lanthanide series may be compounds containing metal of the Group VI elements, the Group VII elements, the Group XIV elements or the lanthanide series, and are preferably, but not limited to, compounds represented by the following general formula (1):

$$R^1_n A X^1_{a-n} \quad (1)$$

wherein A represents an atom of the Group VI elements, the Group VII elements, the Group XIV elements or the lanthanide series in the Periodic Table of the Elements (1993, IUPAC), $R^1$ represents a hydrocarbon or a hydrocarbon oxy group, $X^1$ represents a halogen atom or a hydrogen atom, n represents a numeral which satisfies the expression: $0 \leq n \leq a$, and a represents a valence of A.

$X^1$ in the above general formula (1) preferably represents a halogen atom and specific examples thereof include fluorine atom, chlorine atom, bromine atom, and iodine atom, and a chlorine atom is particularly preferable.

Compounds containing a metal atom of each Group are described below.

When the metal atom in the general formula (1) represents an atom of the Group VI metal elements, the atom of the Group VI metal elements includes chromium atom, molybdenum atom, or tungsten atom, and a chromium atom is particularly preferable.

$R^1$ in the above general formula (1) represents preferably a hydrocarbon group and specific examples thereof include methyl, ethyl, propyl, n-butyl, isobutyl, n-hexyl, allyl, and $\eta^5$-cyclopentadienyl groups. An alkyl or a group having a cyclopentadiene-type anion skeleton are preferable and a group having a cyclopentadiene-type anion skeleton is more preferable. A $\eta^5$-cyclopentadienyl group is most preferable.

When A represents an atom of the Group VI metal elements, a is within a range from 1 to 6. When A represents a chromium atom, a is preferably 2.

n in the general formula (1) represents a numeral which satisfies the expression: $0 \leq n \leq a$. When A represents a chromium atom, n is preferably 1 or 2, and particularly preferably 2.

When A represents a chromium atom, specific examples thereof are benzene chromium tricarbonyl, bis(benzene) chromium(0), bis(cyclopentadienyl) chromium, bis(ethylbenzene) chromium, bis(pentamethylcyclopentadienyl) chromium, chromium(III) acetate, chromium(III) acetylacetone, chromium boride, chromium diboride, chromium(III) bromide, chromium carbide, chromium carbonyl, chromium(II) chloride, chromium(III) chloride, chromium(III) 2-ethylhexanoate, chromium(II) fluoride, chromium(III) fluoride, chromium(III) hexafluoroacetylacetonate, chromium(III) iodide, chromium(III) naphthenate, chromium(III) nitrate, chromium(III) oxide, chromium(VI) oxide, chromium(III) perchlorate, chromium silicide, chromium(III) sulfate, chromium(III) sulfide, chromium(III) tetraphenylporphyrin chloride, chromyl chloride, pentamethylcyclopentadienyl chromium dicarbonyl dimmer, tris(ethylenediamine) chromium(III) chloride, and tris(2,2,6,6-tetramethyl-3,5-heptanedionate) chromium(III).

Bis(cyclopentadienyl) chromium or bis(pentamethylcyclopentadienyl) chromium is preferable, and bis(cyclopentadienyl) chromium is particularly preferable.

Use of the metal compound of the Group VI elements provides a polymer having a more wide molecular weight distribution, in addition to the above feature.

When the metal atom in the general formula (1) represents an atom of the Group VII metal elements, examples of the atom of the Group VI metal elements include manganese atom, technetium atom, and rhenium atom. A manganese atom is particularly preferable.

$R^1$ in the above general formula (1) represents preferably an alkoxy or a group having a cyclopentadiene-type anion skeleton and specific examples thereof are $\eta^5$-cyclopentadienyl, $\eta^5$-pentamethylcyclopentadienyl, methoxy, ethoxy, n-propoxy, and isopropoxy groups. A $\eta^5$-cyclopentadienyl group is particularly preferable.

When A represents an atom of the Group VII metal elements, a is within a range from 1 to 7. When A represents a manganese atom, a is preferably 2.

n represents a numeral which satisfies the expression: $0 \leq n \leq a$. When A represents a manganese atom, n is preferably 1 or 2, and particularly preferably 2.

When A represents a manganese atom, specific examples thereof are bis(cyclopentadienyl) manganese, bis(pentamethylcyclopentadienyl) manganese, cyclopentadienyl manganese tricarbonyl, manganese(II) acetate, manganese(III) acetate, manganese carbonyl, manganese(II) cyclohexanebutylate, manganese(II) methoxide, manganese (II) ethoxide, manganese(II) n-propoxide, manganese(II) isopropoxide, manganese(II) n-butoxide, manganese(II) tert-butoxide, manganese(II) 2,4-pentanedionate, manganese(III) 2,4-pentanedionate, methylcyclopentadienyl manganese tricarbonyl, manganese(II) bromide, manganese (II) carbonate, manganese(II) chloride, manganese(II) fluoride, manganese(III) fluoride, manganese(II) iodide, manganese(II) molybdate, manganese naphthate, manganese(II) nitrate, manganese(II) oxide, manganese(III) oxide, manganese(IV) oxide, manganese(II) perchlorate, manganese(II) selenide, manganese(II) sulfide, and manganese(II) tungstate.

Preferred are bis(cyclopentadienyl) manganese, bis(pentamethylcyclopentadienyl) manganese, manganese(II) methoxide, manganese(II) ethoxide, manganese(II) n-propoxide, manganese(II) isopropoxide, manganese(II) n-butoxide, and manganese(II) tert-butoxide. Bis(cyclopentadienyl) manganese is particularly preferable.

Use of the metal compound of the Group VII elements provides a polymer having a more narrow molecular weight distribution, in addition to the above feature.

When the metal atom in the general formula (1) represents an atom of the Group XIV metal elements, the atom of the Group XIV metal elements is preferably a tin atom or a lead atom, and particularly preferably a tin atom.

$R^1$ in the above general formula (1) is preferably a hydrocarbon oxy group and specific examples thereof are methoxy, ethoxy, tetra-n-propoxy, isopropoxy, n-butoxy, tert-butoxy, phenoxy, and pentafluorophenoxy groups. An alkoxy or aryloxy group is preferable and an alkoxy group is more preferable.

When A represents an atom of the Group XIV metal elements, a is 2 or 4. n represents a numeral, which satisfies the expression: $0 \leq n \leq a$, and is preferably 0 or a, particularly preferably a=n=4.

When A represents a tin atom having a valence of 4, specific examples thereof include tetraalkyltin such as tetramethyltin, tetraethyltin, tetra-n-propyltin, or tetra-n-butyltin; tetraaryltin such as tetraphenyltin or tetrakis(pentafluorophenyl)tin; trialkyltin chloride such as trimethyltin chloride, triethyltin chloride, tri-n-propyltin chloride, or tri-n-butyltin chloride; dialkyltin dichloride such as dimethyltin dichloride, diethyltin dichloride, dipropyltin dichloride, or di-n-butyltin dichloride; alkyl tin trichloride such as methyltin trichloride, ethyltin trichloride, n-propyltin trichloride, or n-butyltin trichloride; tetrahalotin such as tetrachlorotin; tetraalkoxytin such as tetramethoxytin, tetraethoxytin, tetra-n-propoxy in, tetra-isopropoxytin, tetra-n-butoxytin, or tetra-tert-butoxytin; tetraaryloxytin such as tetraphenoxytin or tetrakis(pentafluorophenoxy)tin.

It further includes compounds in which chloride is substituted with fluoride, bromide or iodide.

When A represents a tin atom having a valence of 2, specific examples thereof are tin(II) ethoxide, tin(II) methoxide, tin(II) oxalate, tin(II) 2,4-pentanedionate, tin(II) tartrate, bis(2-ethylhexanoate) tin(II), bis(neodecanoate) tin (II), tin(II) bromide, tin(II) chloride, tin(II) fluoride, and tin(II) iodide.

The compound is preferably a tin compound wherein $R^1$ in the general formula (1) represents alkoxy or aryloxy and n represents a, or a tin compound wherein $X^1$ represents a halogen atom and n is 0, more preferably tin tetramethoxide, tin tetraethoxide, tin tetra-n-propoxide, tin tetra-isopropoxide, tin tetra-n-butoxide, tin tetra-tert-butoxide, tin tetraphenoxide, tetrakis(pentafluorophenoxy)tin, tin(II) ethoxide, tin(II) methoxide, tin tetrafluoride, tin tetrachloride, tin tetrabromide, tin tetraiodide, tin(II) bromide, tin(II) chloride, tin(II) fluoride or tin(II) iodide, further preferably tin tetramethoxide, tin tetraethoxide, tin tetra-n-propoxide, tin tetra-isopropoxide, tin tetra-n-butoxide, tin tetra-tert-butoxide, tin tetraphenoxide, tetrakis(pentafluorophenoxy)tin, tin(II) ethoxide or tin(II) methoxide.

When the metal atom in the general formula (1) represents an atom of the lanthanide series, the atom of lanthanide series is preferably a lanthanum or samarium atom, and particularly preferably a samarium atom.

Specific examples of the hydrocarbon of $R^1$ in the general formula (1) include methyl, ethyl, propyl, n-butyl, isobutyl, n-hexyl, allyl, and $\eta^5$-cyclopentadienyl groups. Examples of the hydrocarbon oxy group include methoxy, ethoxy, tetra-n-propoxy, isopropoxy, n-butoxy, tert-butoxy, phenoxy, and pentafluorophenoxy groups, and a group having a cyclopentadiene-type anion skeleton, alkoxy or aryloxy is preferable. An alkoxy or aryloxy group is more preferable. An aryloxy group is particularly preferable and an isopropoxy group is most preferable.

In case of an atom of the lanthanide series, a is preferably within a range from 2 to 4.

When A represents a samarium atom having a valence of 3, specific examples thereof include samarium(III) methoxide, samarium(III) ethoxide, samarium(III) n-propoxide, samarium(III) isopropoxide, samarium(III) n-butoxide, samarium(III) tert-butoxide, samarium(III) phenoxide, samarium(III) naphthate, samarium (III) oxalate, samarium(III) 2, 4-pentanedionate, samarium(III) 2, 2, 6, 6-tetramethylheptanedionate, tris(cyclopentadienyl)samarium(III), samarium(III) chloride, samarium(III) fluoride, and samarium(III) oxide.

When A represents a samarium atom having a valence of 2, specific examples thereof include samarium(II) iodide.

The compound (b) of the lanthanide series is preferably a samarium compound wherein $R^1$ in the general formula (1) represents an alkoxy or aryloxy group, n represents 3, and a represents 3, more preferably samarium(III) methoxide, samarium(III) ethoxide, samarium(III) n-propoxide, samarium(III) isopropoxide, samarium(III) n-butoxide, samarium(III) tert-butoxide, or samarium(III) phenoxide, and most preferably samarium(III) isopropoxide.

When using the compounds of the Group XIV metal elements and the compounds the lanthanide series, polymers of a higher molecular weight or wider molecular weight distribution can be obtained. The functional group containing active hydrogen or non-proton donative Lewis basic functional group, which is contained in the (c) compounds having a functional group containing active hydrogen or a non-proton donative Lewis basic functional group and an electron-withdrawing group as well as the compound (c) used in the present invention, usually reacts with the metal compound (b).

As used herein, the functional group containing active hydrogen and non-proton donative Lewis basic functional group are the same as those described previously, respectively.

The compound (c) has an electron-withdrawing group and a substituent constant ρ in Hammett's rule can be used as an index of the electron-withdrawing group. A functional group having a positive substituent constant ρ in Hammett's rule corresponds to an electron-withdrawing group.

Specific examples of the electron-withdrawing group are fluorine atom, chlorine atom, bromine atom, iodine atom, and cyano, nitro, phenyl, acetyl, carbonyl, thionyl, sulfone and carboxyl groups.

The compound (c) may have plural kinds of and/or plural functional groups containing active hydrogen or a non-proton donative Lewis basic functional group and an electron-withdrawing group.

Further, in the compound (c), the non-proton donative Lewis basic functional group and the electron-withdrawing group may be the same. In this case, the compound (c) may have only one functional group.

The compound (c) is preferably a compound having a functional group containing active hydrogen and an electron-withdrawing group. Examples thereof are amines, phosphines, alcohols, phenols, thiols, thiophenols, carboxylic acids, and sulfonic acids, which have an electron-withdrawing group.

The compound (c) is more preferably a compound represented by the general formula (2):

$$R^2_m ZH_{z-m} \qquad (2)$$

wherein $R^2$ represents an electron-withdrawing group or a group containing an electron-withdrawing group, Z represents an atom of the Group XV elements or the Group XVI elements, and H represents a hydrogen atom. z is a valence of Z and represents 2 or 3, and m is 1 when z is 2 and m is 1 or 2 when z is 3.

Examples of the group containing an electron-withdrawing group in R2 of the general formula (2) are halogenated alkyl, halogenated aryl, cyanized aryl and nitrated aryl groups having up to 20 carbon atoms, and ester groups.

Specific examples of the halogenated alkyl include fluoromethyl, chloromethyl, bromomethyl, iodomethyl, difluoromethyl, dichloromethyl, dibromomethyl, diiodomethyl, trifluoromethyl, trichloromethyl, tribromomethyl, triiodomethyl, 2,2,2-trifluoroethyl, 2,2,2-trichloroethyl, 2,2,2-tribromoethyl, 2,2,2-triiodoethyl, 2,2,3,3,3-pentafluoropropyl, 2,2,3,3,3-pentachloropropyl, 2,2,3,3,3-pentabromopropyl, 2,2,3,3,3-pentaiodopropyl, 2,2,2-trifluoro-1-trifluoromethylethyl, 2,2,2-trichloro-1-trichloromethylethyl, 2,2,2-tribromo-1-tribromomethylethyl, 2,2,2-triiodo-1-triiodomethylethyl, 1,1,1,3,3,3-hexafluoro-2-trifluoromethylpropyl, 1,1,1,3,3,3-hexachloro-2-trichloromethylpropyl, 1,1,1,3,3,3-hexabromo-2-tribromomethylpropyl, and 1,1,1,3,3,3-hexaiodo-2-triiodomethylpropyl groups.

Specific examples of the halogenated aryl include 2-fluorophenyl, 3-fluorophenyl, 4-fluorophenyl, 2-chlorophenyl, 3-chlorophenyl, 4-chlorophenyl, 2-bromophenyl, 3-bromophenyl, 4-bromophenyl, 2-iodophenyl, 3-iodophenyl, 4-iodophenyl, 2,6-difluorophenyl, 3,5-difluorophenyl, 2,6-dichlorophenyl, 3,5-dichlorophenyl, 2,6-dibromophenyl, 3,5-dibromophenyl, 2,6-diiodophenyl, 3,5-diiodophenyl, 2,4,6-trifluorophenyl, 2,4,6-trichlorophenyl, 2,4,6-tribromophenyl, 2,4,6-triiodophenyl, pentafluorophenyl, pentachlorophenyl, pentabromophenyl, pentaiodophenyl, 2-(trifluoromethyl)phenyl, 3-(trifluoromethyl)phenyl, 4-(trifluoromethyl)phenyl, 2,6-di(trifluoromethyl)phenyl, 3,5-di(trifluoromethyl)phenyl, and 2,4,6-tri(trifluoromethyl)phenyl groups.

Specific examples of the cyanized aryl include 2-cyanophenyl, 3-cyanophenyl, and 4-cyanophenyl groups.

Specific examples of the nitrated aryl include 2-nitrophenyl, 3-nitrophenyl, and 4-nitrophenyl groups.

Specific examples of the ester group include methoxycarbonyl, ethoxycarbonyl, n-propyloxycarbonyl, isopropyloxycarbonyl, phenoxycarbonyl, trifluoromethyloxycarbonyl, and pentafluorophenyloxycarbonyl groups.

$R^2$ in the general formula (2) is preferably a halogenated alkyl group or a halogenated aryl group, and more preferably a fluoromethyl, difluoromethyl, trifluoromethyl, 2,2,2-trifluoroethyl, 2,2,3,3,3-pentafluoropropyl, 2,2,2-trifluoro-1-trifluoromethylethyl, 1,1,1,3,3,3-hexafluoro-2-trifluoromethylpropyl, 4-fluorophenyl, 2,6-difluorophenyl, 3,5-difluorophenyl, 2,4,6-trifluorophenyl or pentafluorophenyl, further preferably trifluoromethyl, 2,2,2-trifluoro-1-trifluoromethylethyl, 1,1,1,3,3,3-hexafluoro-2-trifluoromethylpropyl, or pentafluorophenyl group.

Z in the general formula (2) represents an atom of the Group XV elements or the Group XVI elements in the Periodic Table of the Elements. Specific examples of Z include a nitrogen atom, phosphor atom, oxygen atom, and sulfur atom. A nitrogen atom or oxygen atom is preferable and an oxygen atom is more preferable.

z is a valence of Z, for example, z is 3 when Z is a nitrogen atom or a phosphor atom and z is 2 when Z is an oxygen atom or sulfur atom. m is 1 when z is 2 and m is 1 or 2 when z is 3.

Specific examples of the amines of the compound (c) include di(fluoromethyl)amine, di(chloromethyl)amine, di(bromomethyl)amine, di(iodomethyl)amine, di(difluoromethyl)amine, di(dichloromethyl)amine, di(dibromomethyl)amine, di(diiodomethyl)amine, di(trifluoromethyl)amine, di(trichloromethyl)amine, di(tribromomethyl)amine, di(triiodomethyl)amine, di(2,2,2-trifluoroethyl)amine, di(2,2,2-trichloroethyl)amine, di(2,2,2-tribromoethyl)amine, di(2,2,2-triiodoethyl)amine, di(2,2,3,3,3-pentafluoropropyl)amine, di(2,2,3,3,3-pentachloropropyl)amine, di(2,2,3,3,3-pentabromopropyl)amine, di(2,2,3,3,3-pentaiodopropyl)amine, di(2,2,2-trifluoro-1-trifluoromethylethyl)amine, di(2,2,2-trichloro-1-trichloromethylethyl)amine, di(2,2,2-tribromo-1tribromomethylethyl)amine, di(2,2,2-triiodo-1triiodomethylethyl)amine, di(1,1,1,3,3,3-hexafluoro-2-trifluoromethylpropyl)amine, di(1,1,1,3,3,3-hexachloro-2-trichloromethylpropyl)amine, di(1,1,1,3,3,3-hexabromo-2-tribromomethylpropyl)amine, di(1,1,1,3,3,3-hexaiodo-2-triiodomethylpropyl)amine, di(2-fluorophenyl)amine, di(3-fluorophenyl)amine, di(4-fluorophenyl)amine, di(2-chlorophenyl)amine, di(3-chlorophenyl)amine, di(4-chlorophenyl)amine, di(2-bromophenyl)amine, di(3-bromophenyl)amine, di(4-bromophenyl)amine, di(2-iodophenyl)amine, di(3-iodophenyl)amine, di(4-iodophenyl)amine, di(2,6-difluorophenyl)amine, di(3,5-difluorophenyl)amine, di(2,6-dichlorophenyl)amine, di(3,5-dichlorophenyl)amine, di(2,6-dibromophenyl)amine, di(3,5-dibromophenyl)amine, di(2,6-diiodophenyl)amine, di(3,5-diiodophenyl)amine, di(2,4,6-trifluorophenyl)amine, di(2,4,6-trichlorophenyl)amine, di(2,4,6-tribromophenyl)amine, di(2,4,6-triiodophenyl)amine, di(pentafluorophenyl)amine, di(pentachlorophenyl)amine, di(pentabromophenyl)amine, di(pentaiodophenyl)amine, di(2-(trifluoromethyl)phenyl)amine, di(3-(trifluoromethyl)phenyl)amine, di(4-(trifluoromethyl)phenyl)amine, di(2,6-di(trifluoromethyl)phenyl)amine, di(3,5-di(trifluoromethyl)phenyl)amine, di(2,4,6-tri(trifluoromethyl)phenyl)amine, di(2-cyanophenyl)amine, (3-cyanophenyl)amine, di(4-cyanophenyl)amine, di(2-nitrophenyl)amine, di(3-nitrophenyl)amine, and di(4-nitrophenyl)amine. It further includes phosphine compounds in which a nitrogen atom is substituted with a phosphorus atom. These phosphine compounds are compounds wherein amine of the above specific examples is replaced with phosphine.

Specific examples of the alcohols of the compound (c) include fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentabromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1,1,3,3,3-hexafluoro-2-trifluoromethylpropanol, 1,1,1,3,3,3-hexachloro-2-trichloromethylpropanol, 1,1,1,3,3,3-hexabromo-2-tribromomethylpropanol, and 1,1,1,3,3,3-hexaiodo-2-triiodomethylpropanol. It further includes thiol compounds in which an oxygen atom is substituted with a sulfur atom. These thiol compounds are compounds wherein methanol is replaced with methanethiol, ethanol is replaced with ethanethiol and propanol is replaced with propanethiol, respectively.

Specific examples of the phenols of the compound (c) are 2-fluorophenol, 3-fluorophenol, 4-fluorophenol, 2-chlorophenol, 3-chlorophenol, 4-chlorophenol, 2-bromophenol, 3-bromophenol, 4-bromophenol, 2-iodophenol, 3-iodophenol, 4-iodophenol, 2,6-difluorophenol, 3,5-difluorophenol, 2,6-dichlorophenol, 3,5-dichlorophenol, 2,6-dibromophenol, 3,5-dibromophenol, 2,6-diiodophenol, 3,5-diiodophenol, 2,4,6-trifluorophenol, 2,4,6-trichlorophenol, 2,4,6-tribromophenol, 2,4,6-triiodophenol, pentafluorophenol, pentachlorophenol, pentabromophenol, pentaiodophenol, 2-(trifluoromethyl)phenol, 3-(trifluoromethyl)phenol, 4-(trifluoromethyl)phenol, 2,6-di(trifluoromethyl)phenol, 3,5-di(trifluoromethyl)phenol, 2,4,6-tri(trifluoromethyl)phenol, 2-cyanophenol, 3-cyanophenol, 4-cyanophenol, 2-nitrophenol, 3-nitrophenol, and 4-nitrophenol. It further includes thiophenol compounds in which an oxygen atom is substituted with a sulfur atom. These thiophenol compounds are compounds wherein phenol of the above specific examples is replaced with propanethiol.

Specific examples of the carboxylic acids of the compound (c) are 2-fluorobenzoic acid, 3-fluorobenzoic acid, 4-fluorobenzoic acid, 2,3-difluorobenzoic acid, 2,4-difluorobenzoic acid, 2,5-difluorobenzoic acid, 2,6-difluorobenzoic acid, 2,3,4-trifluorobenzoic acid, 2,3,5-trifluorobenzoic acid, 2,3,6-trifluorobenzoic acid, 2,4,5-trifluorobenzoic acid, 2,4,6-trifluorobenzoic acid, 2,3,4,5-tetrafluorobenzoic acid, 2,3,4,6-tetrafluorobenzoic acid, pentafluorobenzoic acid, fluoroacetic acid, difluoroacetic acid, trifluoroacetic acid, pentafluoroethylcarboxylic acid, heptafluoropropylcarboxylic acid, and 1,1,1,3,3,3-hexafluoro-2-propylcarboxylic acid.

Specific examples of the sulfonic acids of the compound (c) are fluoromethanesulfonic acid, difluoromethanesulfonic acid, trifluoromethanesulfonic acid, pentafluoroethanesulfonic acid, heptafluoropropanesulfonic acid, and 1,1,1,3,3,3-hexafluoro-2-propanesulfonic acid.

In the compound (c), preferred examples of the amines include di(trifluoromethyl)amine, di(2,2,2-trifluoroethyl)amine, di(2,2,3,3,3-pentafluoropropyl)amine, di(2,2,2-trifluoro-1-trifluoromethylethyl)amine, di(1,1,1,3,3,3-hexafluoro-2-trifluoromethylpropyl)amine, and di(pentafluorophenyl)amine; preferred examples of the alcohols include trifluoromethanol, 2,2,2-trifluoroethanol, 2,2,3,3,3-pentafluoropropanol, 2,2,2-trifluoro-1-trifluoromethylethanol, and 1,1,1,3,3,3-hexafluoro-2-trifluoromethylpropanol; preferred examples of the phenols include 2-fluorophenol, 3-fluorophenol, 4-fluorophenol, 2,6-difluorophenol, 3,5-difluorophenol, 2,4,6-trifluorophenol, pentafluorophenol, 2-(trifluoromethyl)phenol, 3-(trifluoromethyl)phenol, 4-(trifluoromethyl)phenol, 2,6-di(trifluoromethyl)phenol, 3,5-di(trifluoromethyl)phenol, and 2,4,6-tri(trifluoromethyl)phenol; preferred examples of the carboxylic acids include pentafluorobenzoic acid and trifluoroacetic acid; and preferred examples of the sulfonic acids include trifluoromethanesulfonic acid.

The compound (c) is preferably di(trifluoromethyl)amine, di(pentafluorophenyl)amine, trifluoromethanol, 2,2,2-trifluoro-1-trifluoromethylethanol, 1,1,1,3,3,3-hexafluoro-2-trifluoromethylpropanol, 4-fluorophenol, 2,6-difluorophenol, 2,4,6-trifluorophenol, pentafluorophenol, 4-(trifluoromethyl)phenol, 2,6-di(trifluoromethyl)phenol, or 2,4,6-tri(trifluoromethyl)phenol, and more preferably pentafluorophenol or 1,1,1,3,3,3-hexafluoro-2-trifluoromethylpropanol (trivial name; perfluoro-tertbutanol).

(A) Modified Particles

The modified particles of the present invention are obtained by contacting particles (a) with a metal compound (b), and contacting the resulting particles with a compound (c) having a functional group containing active hydrogen or a non-proton donative Lewis basic functional group and as electron-withdrawing group.

The contact of (a) with (b), and the subsequent contact of the resulting particles with (c) are preferably carried out under an atmosphere of an inert gas. The contact temperature is generally within a range from −80° C. to 200° C., preferably from −20° to 180° C., and more preferably 0° C. to 150° C. The contact time is usually within a range from one minute to 48 hours, and preferably from 10 minutes to 24 hours. Preferably, a solvent is used, and the solvent to be used is preferably an aliphatic or aromatic hydrocarbon solvent which is inert to (a), (b) and (c). Examples of the aliphatic hydrocarbon solvent are butane, pentane, hexane, heptane, and octane. Examples of the aromatic hydrocarbon solvent are benzene, toluene, and xylene. Alternatively, any mixture obtained by mixing arbitrarily these hydrocarbon solvents can be used.

The contact method for (a) and (b), and the subsequent contact method for the resulting particles and (c) may be the same or different.

The contact-treated particles at each contact stage may be subjected to an isolation operation or not, but the treated particles after contacting at each contact step are preferably isolated. Examples of the isolation method includes a method of decanting a supernatant liquid of the resulting mixture, a method of filtrating the treated particles and washing with an inert solvent, a method of filtrating the treated particles, washing with an inert solvent, and drying under reduced pressure or an inert gas stream, and a method of distilling off a solvent on contact treatment under reduced pressure or an inert gas stream. When the isolation operation of the resulting treated particles is not carried out, the resulting particles in a treating liquid may be used in the polymerization reaction in a state of being suspended in an inert solvent.

In the preparation of the modified particles of the present invention, with regard to the amount of (b) to (a), the amount of the atoms of metal compound (b) which are contained in the particles obtained by contacting (a) with (b) is preferably 0.1 mmol or more in terms of mole of said atoms which are contained in 1 g of particles, and more preferably within a range from 0.5 to 20 mmol. With regard to the amount of (c), the mole ratio [(c)/(b)] of the compound (c) having a functional group containing active hydrogen or a non-proton donative basic functional group and an electron-withdrawing group to the atoms of the metal compound (b) which are contained in 1 g of the particles is preferably within a range from 0.01 to 100, more preferably from 0.05 to 20, and further preferably from 0.1 to 10.

The modified particles of the present invention can be used as a carrier for supporting a catalyst component for olefin polymerization such as transition metal compound, and is preferably used in the polymerization accompanied with formation of polymer particles. The modified particles of the present invention can function as a catalyst component for olefin polymerization. The catalyst for olefin polymerization obtained by using the modified particles of the present invention includes, for example, a catalyst prepared by contacting the modified particles (A) with a transition metal compound (B), or a catalyst prepared by contacting the modified particles (A), a transition metal compound (B) and an organometallic compound (C). The latter is preferred because of its higher activity.

(B) Transition Metal Compound

Any transition metal compound can be used in the present invention as far as it has an activity to olefin polymerization, but the transition metal is preferably one of the Group IV elements or the lanthanide series in the Periodic Table of the Elements (1993, IUPAC). More preferred transition metal compound is a metallocene transition metal compound.

The metallocene transition metal compound is, for example, a compound represented by the following general formula (3):

$$ML_aR^3_{p-a} \qquad (3)$$

wherein M represents an atom of transition metals of the Group IV elements or the lanthanide series in the Periodic Table of the Elements (1993, IUPAC). L represents a group having a cyclopentadiene-type anion skeleton or a group containing a heteroatom, of which at least one is a group having a cyclopentadiene-type anion skeleton. A plurality of L may be the same or different, or may be bridged each other. $R^3$ represents a halogen atom or a hydrocarbon having 1 to 20 carbon atoms. a is a numeral which satisfies the expression: $0<a\leq p$, and p represents a valence of the transition metal atom M.

Examples of the transition metal atom of the Group IV elements in the Periodic Table include a titanium atom, zirconium atom, and hafnium atom. Examples of the transition metal atom of the lanthanide series include a samarium atom. Preferred transition metal atom is a titanium atom, zirconium atom or hafnium atom.

Examples of the group having a cyclopentadiene-type anion skeleton are an $\eta^5$-chclopantadienyl group, $\eta^5$-substituted cyclopentadienyl group, and polycyclic group having a cyclopentadiene-type anion skeleton. Examples of the substituent for the $\eta^5$-substituted cyclopentadienyl include hydrocarbon group having 1 to 20 carbon atoms, halogenated hydrocarbon group having 1 to 20 carbon atoms, and silyl having 1 to 20 carbon atoms or the like. Examples of the polycyclic group having a cyclopentadiene-type anion skeleton include $\eta^5$-indenyl and $\eta^5$-fluorenyl groups.

Examples of the heteroatom in the group containing a heteroatom include nitrogen atom, oxygen atom, and sulfur atom. Examples of the group having a heteroatom include a hydrocarbonamino, hydrocarbonphosphino, hydrocarbonoxy, and hydrocarbonthio groups having up to 20 carbon atoms, and an alkoxy, aryloxy, alkylthio, arylthio, dialkylamino, diarylamino, dialkylsulphino and diarylphophino groups having up to 20 carbon atoms are preferable.

Specific examples of the $\eta^5$-substututed cyclopentadienyl group are $\eta^5$-methylcyclopentadienyl, $\eta^5$-ethylcyclopentadienyl, $\eta^5$-n-propylcyclopentadienyl, $\eta^5$-isopropylcyclopentadienyl, $\eta^5$-n-butylcyclopentadienyl, $\eta^5$-isobutylcyclopentadienyl, $\eta^5$-sec-butylcyclopentadienyl, $\eta^5$-tert-butylcyclopentadienyl, $\eta^5$-1,2-dimethylcyclopentadienyl, $\eta^5$-1,3-dimethylcyclopentadienyl, $\eta^5$-1,2,3-trimethylcyclopentadienyl, $\eta^5$-1,2,4-trimethylcyclopentadienyl, $\eta^5$-tetramethylcyclopentadienyl, $\eta^5$-pentamethylcyclopentadienyl, and $\eta^5$-trimethylsilylcyclopentadienyl groups.

Specific examples of the polycyclic group having a cyclopentadiene-type anion skeleton are $\eta^5$-indenyl, $\eta^5$-methylindenyl, $\eta^5$-4-methylindenyl, $\eta^5$-4,5,6,7-tetrahydroindenyl, and $\eta^5$-fluorenyl groups.

Specific examples of the group containing a heteroatom are methoxy, ethoxy, propoxy, butoxy, phenoxy, thiomethoxy, dimethylamino, diethylamino, dipropylamino, dibutylamino, diphenylamino, pyrrolyl, and dimethylphosphino groups.

Groups having a cyclopentadiene-type anion skeleton one another, and a group having a cyclopentadiene-type anion skeleton and a group containing a heteroatom may be bridged. In this case, these may be bridged through an alkylene group such as ethylene or propylene group; a substituted alkylene group such as dimethylmethylene or diphenylmethylene group; or a substituted silylene group such as silylene, dimethylsilylene, diphenylsilylene or tetramethyldisilylene.

Examples of $R^3$ include halogen atom such as fluorine atom, chlorine atom, bromine atom, or iodine atom; and hydrocarbon having 1 to 20 carbon atoms, such as methyl, ethyl, n-propyl, isopropyl, n-butyl, phenyl, or benzyl group. $R^3$ is preferably a chlorine atom, a methyl group or a benzyl group.

Specific examples of the metallocene transition metal compound wherein the transition metal atom M in the general formula(3) is a zirconium atom among the metallocene transition metal compounds represented by the general formula (3) include bis(cyclopentadienyl) zirconium dichloride, bis(methylcyclopentadienyl) zirconium dichloride, bis(n-butylcyclopentadienyl) zirconium dichloride, bis(1,3-dimethylcyclopentadienyl) zirconium dichloride, bis(pentamethylcyclopentadienyl) zirconium dichloride, bis(indenyl) zirconium dichloride, bis(4,5,6,7-tetrahydroindenyl) zirconium dichloride, bis(fluorenyl) zirconium dichloride, ethylenebis(indenyl) zirconium dichloride, ethylenebis(2-methylindenyl) zirconium dichloride, ethylenebis(4,5,6,7-tetrahydroindenyl) zirconium dichloride, isopropylidene(cyclopentadienyl)(fluorenyl) zirconium dichloride, dimethylsilylenebis(cyclopentadienyl) zirconium dichloride, dimethylsilylenebis(indenyl) zirconium dichloride, dimethylsilylenebis(2-methylindenyl) zirconium dichloride, dimethylsilylenebis(4,5,6,7-tetrahydroindenyl) zirconium dichloride, dimethylsilylene(cyclopentadienyl)(fluorenyl) zirconium dichloride, diphenylsilylenebis(indenyl) zirconium dichloride, (cyclopentadienyl)(dimethylamide) zirconium dichloride, (cyclopentadienyl)(phenoxy) zirconium dichloride, dimethylsilyl(tert-butylamide)(tetramethylcyclopentadienyl) zirconium dichloride, bis(cyclopentadienyl) zirconium dimethyl, bis(methyl cyclopentadienyl) zirconium dimethyl, bis (pentamethylcyclopentadienyl) zirconium dimethyl, bis(indenyl) zirconium dimethyl, bis(4,5,6,7-tetrahydroindenyl) zirconium dimethyl, bis(fluorenyl) zirconium dimethyl, ethylenebis(indenyl) zirconium dimethyl, and dimethylsilyl (tert-butylamide)(tetramethylcyclopentadienyl) zirconium dimethyl.

It further includes compounds wherein the zirconium is replaced with titanium or hafnium in the above zirconium compounds.

These metallocene transition metal compounds may be used alone or in combination.

(C) Organoaluminum Compound

As the organoaluminum compound of component (C) used in the present invention, known organoaluminum compounds can be used. They are preferably organoaluminum compounds represented by the following general formula (4):

$$R^4_b AlX^2_{3-b} \qquad (4)$$

wherein $R^4$ represents a hydrocarbon having 1 to 8 carbon atoms, $X^2$ represents a hydrogen atom or a halogen atom, and b represents a numeral which satisfies the expression: $0<b\leq 3$.

In the general formula (4) which represents an organoaluminum compound, specific examples of $R^4$ include methyl, ethyl, n-propyl, n-butyl, isobutyl, n-hexyl, 2-methylhexyl, and n-octyl groups. Ethyl, n-butyl, isobutyl and n-hexyl groups are preferable. When $x^2$ represents a halogen atom, specific examples thereof include fluorine atom, chlorine atom, bromine atom, and iodine atom. A chlorine atom is preferable.

Specific examples of the organoaluminum compound represented by the general formula (4) $R^4_b AlX^2_{3-b}$ include trialkyl aluminums such as trimethylaluminum, triethylaluminum, tri-n-propylaluminum, tri-n-butylaluminum, triisobutylaluminum, tri-n-hexylaluminum, and tri-n-octylaluminum; dialkylaluminums chloride such as dimethylaluminum chloride, diethylaluminum chloride, di-n-propylaluminum chloride, di-n-butylaluminum chloride, diisobutylaluminum chloride, and di-n-hexyl aluminum chloride; alkylaluminum dichlorides such as methylaluminum dichloride, ethylaluminum dichloride, n-propylaluminum dichloride, n-butylaluminum dichloride, isobutylaluminum dichloride, and n-hexylaluminum dichloride; and dialkylaluminum hydrides such as dimethylaluminum hydride, diethylaluminum hydride, di-n-propylaluminum hydride, di-n-butylaluminum hydride, diisobutylaluminum hydride, and di-n-hexyl aluminum hydride. Among these organoaluminum compounds, trialkylaluminums are preferred and trimethylaluminum, triethylaluminum, tri-n-butylaluminum, triisobutylaluminum or tri-n-hexylaluminum is more preferred and, furthermore, triisobutylaluminum or tri-n-hexyl aluminum is further preferred.

These organoaluminum compounds may be used alone or in combination.

The catalyst for olefin polymerization of the present invention can be obtained by contacting the modified particles (A), the transition metal compound (B), and the organometallic compound (C). The amount of the component (B) is usually within a range from $1 \times 10^{-6}$ to $1 \times 10^{-3}$ mol per 1 g of the modified particles(A), and preferably from $5 \times 10^{-6}$ to $1 \times 10^{-4}$ mol. On the other hand, with regard to the amount of the organometallic compound (C), the mole ratio (C)/(B) of the metal atoms of the organometallic compound (C) to the transition metal atoms of the transition metal compound (B) is preferably within a range from 0.01 to 10,000, more preferably from 0.1 to 5,000, and most preferably from 1 to 2,000.

In the present invention, (A), (B), and (C) can be used by charging in a reactor in arbitrary order on polymerization. Alternatively, arbitrary components in arbitrary combinations may be previously contacted each other and then the resultant and the remaining component, if any, may be charged in the reactor.

In the present invention, the monomer used in polymerization may be any of olefins and diolefins, which have 2 to 20 carbon atoms. The monomers are described bellow, but it should not be limited thereto. Specific examples of the olefin include ethylene, propylene, 1-butene, 1-pentene, 1-hexene, 1-heptene, 1-octene, 1-nonene, 1-decene, 4-methyl-1-pentene, and vinylcyclohexane. The diolefin compounds include, for example, a conjugated diene and non-conjugated diene. Specific examples of the compound include non-conjugated dienes such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-2-norbornene, norbornadiene, 5-methylene-2-norbornene, 1,5-cyclooctadiene, and 5,8-endomethylenehexahydronaphthalenel; and conjugated dienes such as 1,3-butadiene, isoprene, 1,3-hexadiene, 1,3-octadiene, 1,3-cyclooctadiene, and 1,3-cyclohexadiene.

Specific examples of the monomer which constitutes a copolymer include combinations of ethylene and propylene, ethylene and 1-butene, ethylene and 1-hexene, and propylene and 1-butene, but are not limited to the above compounds. The present invention is suited for preparation of a copolymer of ethylene and an α-olefin having 3 to 20 carbon atoms.

In the present invention, an aromatic vinyl compound can be also used as the monomer. Examples of the aromatic vinyl compound are styrene, o-methyl styrene, m-methyl styrene, p-methyl styrene, and divinylbenzene.

The polymerization method is not also limited, and there can be carried out gas phase polymerization in a gaseous monomer, solution polymerization and slurry polymerization using a solvent. Examples of the solvent used in the solution polymerization or slurry polymerization include aliphatic hydrocarbon solvents such as butane, pentane, heptane, and octane; aromatic hydrocarbon solvents such as benzene and toluene; and halogenated hydrocarbon solvents such as methylene chloride. Alternatively, olefin itself can be also used as the solvent. The polymerization method can be either batch wise polymerization or continuous polymerization. The polymerization may be carried out in two or more steps that differ in reaction conditions. Generally, the polymerization time is appropriately determined depending on types of desired olefin polymer and reaction apparatuses, and can be within a range from one minute to 20 hours.

The present invention is suitably applied to the polymerization accompanied with formation of polymer particles (for example, slurry polymerization, gas phase polymerization, etc.).

The slurry polymerization may be carried out according to known slurry polymerization procedures and polymerization conditions, but is not limited thereto. Preferred polymerization procedure in a slurry method includes a continuous polymerization wherein a monomers (and a comonomer), feeds and a diluent are, if necessary, continuously supplied in a reactor, and polymer products are taken out continuously or periodically from the reactor. As a reactor, a loop reactor may be used, or combinations of stirring reactors which are different each other or differ in reaction conditions may be used. And, a plurality of reactors may be used in series or parallel, or in combination thereof.

As the diluent, there can be used, for example, an inert diluent (medium) such as paraffin, cycloparaffin or aromatic hydrocarbon. The temperature of the polymerization reactor or the reaction zone can be usually within a range from about 50° C. to about 100° C., and preferably from 60° C. to 80° C. The pressure can usually vary within a range from about 0.1 MPa to about 10 MPa, and preferably from 0.5 MPa to 5 MPa. It is possible to apply a pressure that can bring the monomer into contact with the comonomer while maintaining a catalyst in a suspension state and maintaining the medium and at least a part of the monomer and comonomer in a liquid phase. Accordingly, the medium, temperature and pressure may be selected such that an olefin polymer is produced in the form of solid particles and collected in that form.

The molecular weight of the olefin polymer can be controlled by various known means such as control of the temperature of the reaction zone, and introduction of hydrogen.

The respective catalyst components and a monomer (and comonomer) can be added to a reactor or reaction zone by any known procedure in any order. There can be used, for example, a method of adding the respective catalysts and the monomers (and comonomers) to the reaction zone, simultaneously or successively. If necessary, each catalyst component can be pre-contacted in an inert atmosphere prior to contact with the monomer (and comonomer).

The gas phase polymerization may be carried out according to known gas phase polymerization procedures and conditions, but is not limited thereto. As a gas phase polymerization apparatus, there can be used a fluidized bed reactor, preferably a fluidized bed reactor having an extended portion. A reaction apparatus provided with a stirring blade in a reaction vessel can also be used without causing any problem.

As the method of supplying the respective components to the polymerization vessel, there can be used a method of supplying in the water-free state using an inert gas such as nitrogen or argon, hydrogen, or ethylene, or a method of supplying in a state of a solution or a slurry by dissolving into a solvent or diluting with a solvent. The respective catalyst components may be supplied separately, or may be supplied after pre-contacting arbitrary components in any order.

With regard to reaction conditions, the temperature is lower than temperature at which the polymer is molten, preferably within a range from 20° C. to 100° C., and particularly preferably from 40° C. to 90° C. The pressure is preferably within a range from 0.1 MPa to 5 MPa, and more preferably from 0.3 MPa to 4 MPa. For the purpose of adjusting the melt-flow characteristics of the final product, hydrogen may be added as a molecular weight adjuster. During the polymerization, an inert gas is present in a mixed gas.

EXAMPLE

The present invention is illustrated by the following examples and comparative examples in detail, but not limited thereto. Properties of the olefin polymer in the Examples were determined by the following procedures.

(1) α-olefin content in copolymer (short chain branching degree): The α-olefin content in the resulting polymer (short chain branching degree) was determined from an infrared absorption spectrum. The measurement and calculation were carried out by using a characteristic absorption derived from α-olefin, e.g. 1375 cm$^{-1}$ (propylene) and 772 cm$^{-1}$ according to a method described in a literature "Characterization of polyethylene by infrared absorption spectrum", authored by Takayama and Usami et al., or Die Makromoleculare Chemie, 177, 461 (1976) McRae, M. A., Madams, W. F.". Infrared absorption spectrum was determined by using an infrared spectrometer (manufactured by Nippon Bunko Kogyo, FT-IR7300).

The SCB was expressed as a short chain branching per 1000 carbon.

(2) Melting point of copolymer: It was determined by using a differential scanning calorimeter(manufactured by Seiko Electronic Co., Ltd., Type: Seiko SSC-5200) under the following conditions:

Heating: 40° C. to 150° C. (10° C./min), maintaining for 5 minutes

Cooling: 150° C. to 40° C. (5° C./min), maintaining for 10 minutes

Measurement: 40° C. to 160° C. (heating at 5° C./min)

(3) Molecular weight and molecular weight distribution: They were determined by using a gel permeation chromatography (manufactured by Waters, type: 150, C) according to the following conditions. The molecular weight distribution (Mw/Mn) was expressed as the ratio of the weight average molecular weight to the number average molecular weight.

Column: TSK gel GMH-HT

Measuring temperature: set to 145° C.

Measuring concentration: 10 mg/10 ml-orthodichlorobenzene

Example 1

(1) Preparation of Modified Particles

A 50 ml four-necked flask equipped with a stirrer, a dropping funnel and a thermometer was dried under reduced pressure and then the atmosphere in the flask was replaced with nitrogen. In the flask, 1.02 g of silica (manufactured by Davison Co., Ltd., Sylopol 948, average particle diameter= 55 μm, pore volume=1.66 ml/g, specific surface area=309 m2/g) heat-treated at 300° C. under a nitrogen stream was collected. 13 ml of toluene was added thereto to obtain slurry, and a solution of 0.668 g (2.04 mmol) of samarium (III) isopropoxide in 17 ml of toluene was slowly added dropwise. The mixture was stirred for two hours at room temperature and the supernatant was removed by filtration, and then the remaining solid compound was washed with 20 ml of toluene four times. Then 30 ml of toluene was added to obtain slurry and 20 ml (4.0 mmol) of pentafluorophenol (2 mol/L, toluene solution) was slowly added. The mixture was stirred at 80° C. for two hours and the supernatant was removed by filtration, and then the remaining solid compound was washed with 20 ml of toluene four times and washed once with 20 ml of hexane. The solid compound was dried under reduced pressure to obtain a flowable solid compound. The concentration of the samarium atom in the solid compound was 0.73 mmol/g, and the concentration of the fluorine atom was 3.9 mmol/g.

(2) Polymerization

After a 400 ml (inner volume) autoclave equipped with a stirrer was dried under reduced pressure and the atmosphere was replaced with argon, the autoclave was evacuated and 190 ml of hexane and 10 ml of 1-hexene were charged and heated to 70° C. Then, ethylene was added so that a partial pressure becomes 6 kg/cm$^2$, thereby to stabilize the system, and 0.25 ml of a solution of triisobutyl aluminum in heptane adjusted to the concentration of 1 mmol/ml was charged. Then, 0.5 ml of a solution of ethylenebis(indenyl)zirconium dichloride in toluene adjusted to the concentration of 2 μmol/ml was charged and 55.1 mg of the solid compound obtained in (1) was charged as a solid catalyst component. The polymerization was carried out at 70° C. for 30 minutes while feeding ethylene so as to keep total pressure constant. As a result, 0.87 g of olefin polymer was obtained. The polymerization activity per transition metal atom was 1.7× 10$^6$ g/mol Zr/hour, and the polymerization activity per solid catalyst component was 32 g/g solid catalyst component/ hour. The resulting olefin polymer had the following properties: SCB=15.52; m.p., 97.7° C. and 109.6° C.; Mw=190, 000; Mw/Mn=3.7. The resulting polymer was in the form of particles.

Comparative example 1

(1) Contact-treatment of Particles(a) with Trimethyl Aluminum and Subsequent Treatment with the Compound(c)

A 200 ml four-necked flask equipped with a stirrer, a dropping funnel and a thermometer was dried under reduced pressure and then the atmosphere in the flask was replaced by nitrogen. In the flask, 382 g of silica (manufactured by Davison Co., Ltd., Sylopol 948; average particle diameter= 64 μm; pore volume=1.62 ml/g; specific surface area=312 m2/g) heat-treated at 300° C. under nitrogen stream was collected. 3.3 L of toluene was added and the mixture was cooled to 5° C. A solution of 75 ml of trimethylaluminum in 300 ml of toluene was slowly added dropwise thereto. After the completion of dropwise addition, the mixture was stirred for 30 minutes at 5° C., heated to 80° C. and then stirred for two hours. The solvent was filtrated through a grass filter and the filtrate was washed with toluene four times. After washing, 3.3 L of toluene was added and the mixture was cooled to 5° C. 420 ml of pentafluorophenol (2.0M toluene solution) was slowly added dropwise. After the completion of dropwise addition, the mixture was stirred at 5° C. for 30 minutes, heated to 80° C. and then stirred for two hours. The solid compound was filtrated, and washed with toluene four times and then washed once with hexane. The resulting solid compound was dried under reduced pressure to obtain 434 g of a flowable solid compound. The concentration of the aluminum atom in the solid compound was 1.22 mmol/g and the concentration of the fluorine atom was 4.63 mmol/g.

(2) Polymerization

After a 400 ml (inner volume) autoclave equipped with a stirrer was dried under reduced pressure and the atmosphere was replaced by argon, the autoclave was evacuated and 190 ml of hexane and 10 ml of 1-hexene were charged and heated to 70° C. Then, ethylene was added so that a partial pressure becomes 6 kg/cm2, thereby to stabilize the system, and 0.25 ml of a solution of triisobutylaluminum in heptane adjusted to the concentration of 1 mmol/ml was charged. Then, 0.15 ml of a solution of ethylenebis(indenyl) zirconium dichloride in toluene adjusted to the concentration 2 μmol/ml was charged and 10.2 mg of the solid compound obtained in (1) was charged as a solid catalyst component. The polymerization was carried out at 70° C. for 30 minutes while feeding ethylene so as to keep total pressure constant. As a result, 20.34 g of olefin polymer was obtained. The polymerization activity per transition metal atom was $1.4 \times 10^8$ g/mol Zr/hour and the polymerization activity per solid catalyst component was 4000 g/g solid catalyst component/hour. The resulting olefin polymer had the following properties: SCB=28.40; m.p., 85.8° C. and 96.9° C.; Mw=82,000; Mw/Mn=2.6. The resulting polymer was in the form of particles.

Example 2

(1) Preparation of Modified Particles

A 50 ml four-necked flask equipped with a stirrer, a dropping funnel and a thermometer was dried under reduced pressure and then the atmosphere in the flask was replaced by nitrogen. In the flask, 0.39 g (2.1 mmol) of bis (cyclopentadienyl)manganese and 30 ml of toluene were added, the mixture was stirred. 0.77 g of silica (manufactured by Davison Co., Ltd., Sylopol 948; average particle diameter=55 μm; pore volume=1.66 ml/g; specific surface area=309 m2/g) treated with heat at 300° C. under nitrogen stream was charged. The mixture was stirred for two hours at room temperature, the supernatant was filtrated off and the remaining solid compound was washed with 20 ml of toluene four times. Then, 30 ml of toluene was added to obtain slurry, and 1.1 ml (2.2 mmol) of pentafluorophenol (2 mol/L, toluene solution) was slowly added. The mixture was stirred for two hours at 80° C. and the supernatant was removed by filtration. The remaining solid compound was washed with 20 ml of toluene four times and then washed once with 20 ml of hexane. Then, the solid compound was dried under reduced pressure to obtain a fluid solid compound. The concentration of the manganese atom in the solid compound was 1.5 mmol/g, and the concentration of the fluorine atom was 6.8 mmol/g.

(2) Polymerization

After a 400 ml (inner volume) of autoclave equipped with a stirrer was dried under reduced pressure and the atmosphere in the autoclave was replaced by argon, the autoclave was evacuated. 190 ml of hexane and 10 ml of 1-hexene were charged and heated to 70° C. Then, ethylene was added so that a partial pressure becomes 6 kg/cm$^2$, thereby to stabilize the system, and 0.25 ml of a solution of triisobutylaluminum in heptane adjusted to the concentration of 1 mmol/ml was charged. Then, 0.5 ml of a solution of ethylenebis(indenyl)zirconium dichloride in toluene adjusted to the concentration 2 μmol/ml was charged and 90.3 mg of the solid compound obtained in (1) was charged as a solid catalyst component. The polymerization was carried out at 70° C. for 30 minutes while feeding ethylene so as to keep total pressure constant. As a result, 15.8 g of olefin polymer was obtained. The polymerization activity per transition metal atom was $3.2 \times 10^7$ g/mol Zr/hour and the polymerization activity per solid catalyst component was 350 g/g solid catalyst component/hour. The resulting olefin polymer had the following properties: m.p., 86.3° C. and 98.8° C.; Mw=74,000; Mw/Mn=1.9, SCB=25.14.

Example 3

(1) Contacting treatment of the Particles (a) with the Metal Compound (b) and Subsequent Treatment with the Compound (c)

A 50 ml four-necked flask equipped with a stirrer, a dropping funnel and a thermometer was dried under reduced pressure and the atmosphere was replaced by nitrogen. In the flask, 0.88 g of silica (manufactured by Davison Co., Ltd., Sylopol 948; average particle diameter=55 μm; pore volume=1.66 ml/g; specific surface area=309 m2/g) treated with heat at 300° C. under nitrogen stream and 15 ml of toluene were charged and then the mixture was stirred at room temperature. A solution of 0.321 g (1.76 mmol) of bis(cyclopentadienyl)chromium in 15 ml of toluene was slowly added dropwise. After the completion of the dropwise addition, the mixture was stirred for two hours at room temperature and the supernatant was removed by filtration and, furthermore, the remaining solid compound was washed with 20 ml of toluene four times. Then, 30 ml of toluene was added to obtain slurry and 0.88 ml (1.8 mmol) of pentafluorophenol (2 mol/L, hexane solution) was slowly added. The mixture was stirred for two hours at 80° C., the supernatant was filtrated off, and the remaining solid compound was washed with 20 ml of toluene four times and then washed once with 20 ml of hexane once. Then, the solid compound was dried under reduced pressure to obtain a solid compound with fluidity. The concentration of the chromium atom in the solid compound was 0.98 mmol/g and the concentration of the fluorine atom was 3.5 mmol/g.

(2) Polymerization

After a 400 ml (inner volume) autoclave equipped with a stirrer was dried under reduced pressure and the atmosphere was replaced by argon, the autoclave was evacuated. 190 ml of hexane and 10 ml of 1-hexene were charged and heated to 70° C. Then, ethylene was added so that a partial pressure becomes 6 kg/cm2, thereby to stabilize the system, and 0.25 ml of a solution triisobutylaluminum in heptane adjusted to the concentration of 1 mmol/ml was charged. Then, 0.5 ml of a solution of ethylenebis(indenyl)zirconium dichloride in toluene adjusted to the concentration 2 μmol/ml was charged and 48.4 mg of the solid compound obtained in (1) was charged as a solid catalyst component. The polymerization was carried out at 70 for 30 minutes with feeding ethylene so as to keep total pressure constant. As a result, 5.87 g of olefin polymer was obtained. The polymerization activity per transition metal atom was $1.2 \times 10^7$ g/mol Zr/hour and the polymerization activity per solid catalyst component was 240 g/g solid catalyst component/hour. The resulting olefin polymer had the following properties: m.p. , 99.2, 110.2 and 130.7° C.; Mw=800,000; Mw/Mn=10.9, SCB=12.62. The resulting polymer was in the form of particles.

Example 4

(1) Contacting Treatment of the Particles (a) with the Metal Compound (b) and Subsequent Treatment with the Compound (c)

A 50 ml four-necked flask equipped with a stirrer, a dropping funnel and a thermometer was dried under reduced pressure and then the atmosphere in the flask was replaced by nitrogen. In the flask, 0.94 g of silica (manufactured by Davison Co., Ltd., Sylopol 948; average particle diameter= 55 μm; pore volume=1.66 ml/g; specific surface area=309 m²/g) treated with heat at 300° C. under nitrogen stream was collected. 13 ml of toluene was added thereto to obtain slurry and a solution of 0.77 g (1.88 mmol) of tin tetra-tert-butoxide in 17 ml of toluene was slowly added dropwise. The mixture was stirred at 80° C. for two hours and the supernatant was removed by filtration, and then the remaining solid compound was washed with 20 ml of toluene four times. Then, 30 ml of toluene was added to obtain slurry and 5.6 ml (5.6 mmol) of pentafluorophenol (1 mol/L, toluene solution) was slowly added. The mixture was stirred for two hours at 80° C. and the supernatant was filtrated off. The remaining solid compound was washed with 20 ml of toluene four times and then washed once with 20 ml of hexane. Then, the solid compound was dried under reduced pressure to obtain a solid compound with fluidity. The concentration of the tin atom in the solid compound was 1.0 mmol/g and the concentration of the fluorine atom was 3.5 mmol/g.

(2) Polymerization

After a 400 ml (inner volume) autoclave equipped with a stirrer was dried under reduced pressure and the atmosphere in the autoclave was replaced by argon, the autoclave was evacuated. 190 ml of hexane and 10 ml of 1-hexene were charged and heated to 70° C. Then, ethylene was added so that a partial pressure becomes 6 kg/cm2, thereby to stabilize the system, and 0.25 ml of a solution triisobutylaluminum in heptane adjusted to the concentration of 1 mmol/ml was charged thereto. Then, 0.5 ml of a solution of ethylenebis (indenyl)zirconium dichloride in toluene adjusted to the concentration 2 μmol/ml was charged and 92.9 mg of the solid compound obtained in (1) was charged as a solid catalyst component. The polymerization was carried out at 70° C. for 30 minutes while feeding ethylene so as to keep total pressure constant. As a result, 7.70 g of olefin polymer was obtained. The polymerization activity per transition metal atom was $1.5\times10^7$ g/mol Zr/hour and the polymerization activity per solid catalyst component was 170 g/g solid catalyst component/hour. The resulting olefin polymer had the following properties: SCB=16.89; m.p., 97.6 and 107.7° C.; Mw=220,000; Mw/Mn=4.2. The resulting polymer was in the form of particles.

As described above in detail, according to the present invention, modified particles which can provide a polymer having a high activity and excellent in shape and properties of particles by using together with a transition metal compound, when the catalyst for olefin polymerization using a transition metal compound is applied to polymerization forming polymer particles (e.g., slurry polymerization, gas phase polymerization, etc.), and which can provide a catalyst capable of producing desired copolymer stably due to relatively small of short chain branch (SCB) in production of a copolymer; a carrier composed of said particles; a catalyst component for olefin polymerization composed of said particles; a catalyst for olefin polymerization using said particles; and a process for producing an olefin polymer using said catalyst.

What is claimed is:

1. A catalyst for olefin polymerization obtained by contacting modified particles (A) with a transition metal compound (B), wherein the modified particles (A) are obtained by contacting particles (a) with a metal compound (b) represented by the general formula (1):

$$R^1_n AX^1_{a-n} \qquad (1)$$

wherein A is a metal atom selected from the group consisting of a samarium atom, chromium atom, manganese atom and tin atom, R¹ represents a hydrocarbon or a hydrocarbon oxy group, X¹ represents a halogen atom or a hydrogen atom, n represents a numeral which satisfies the expression: $0 \leq n \leq a$, and a represents a valence of A, and contacting the resulting particles with a compound (c) having a functional group containing active hydrogen or a non-proton donative Lewis basic functional group, and an electron-withdrawing group.

2. A catalyst for olefin polymerization obtained by contacting modified particles (A) with a transition metal compound (B) and an organometallic compound (C), wherein the modified particles (A) are obtained by contacting particles (a) with a metal compound (b) selected from the group consisting of compounds of the Groups VI, VII and XIV metal elements and compounds of the lanthanide series, and contacting the resulting particles with a compound (c) having a functional group containing active hydrogen or a non-proton donative Lewis basic functional group, and an electron-withdrawing group.

3. The catalyst for olefin polymerization according to claim 2, wherein the metal compound (b) is a compound represented by the general formula (1):

$$R^1_n AX^1_{a-n} \qquad (1)$$

wherein A represents an atom of the Group VI elements, the Group VII elements, the Group XIV elements or the lanthanide series in the Periodic Table of the Elements (1993, IUPAC), R represents a hydrocarbon or a hydrocarbon oxy group, X¹ represents a halogen atom or a hydrogen atom, n represents a numeral which satisfies the expression: $0 \leq n \leq a$, and a represents a valence of A.

4. The catalyst for olefin polymerization according to claim 3, wherein said A is a metal atom selected from the group consisting of a samarium atom, chromium atom, manganese atom and tin atom.

5. A process for producing an olefin polymer, which comprises polymerizing an olefin in the presence of a catalyst for olefin polymerization, obtained by contacting modified particles (A), wherein said modified particles (A) are obtained by contacting particles (a) with a metal compound (b) selected from the group consisting of compounds of the Groups VI, VII and XIV metal elements and compounds of the lanthanide series, and contacting the resulting particles with a compound (c) having a functional group containing active hydrogen or a non-proton donative Lewis basic functional group, and an electron-withdrawing group with a transition metal compound (B).

6. The process for producing an olefin polymer according to claim 5, wherein the metal compound (b) is a compound represented by the general formula (1):

$$R^1_n AX^1_{a-n} \qquad (1)$$

wherein A represents an atom of the Group VI elements, the Group VII elements, the Group XIV elements or the lanthanide series in the Periodic Table of the Elements (1993, IUPAC), R¹ represents a hydrocarbon or a hydrocarbon oxy group, $X^1$ represents a halogen atom or a hydrogen atom, n represents a numeral which satisfies the expression: $0 \leq n \leq a$, and a represents a valence of A.

7. A process for producing an olefin polymer, which comprises polymerizing an olefin in the presence of a catalyst for olefin polymerization obtained by contacting modified particles (A) with a transition metal compound (B), wherein the modified particles (A) are obtained by contacting particles (a) with a metal compound (b) represented by the general formula (1):

$$R^1_n AX^1_{a-n} \tag{1}$$

wherein A is a metal atom selected from the group consisting of a samarium atom, chromium atom, manganese atom and tin atom, $R^1$ represents a hydrocarbon or a hydrocarbon oxy group, $X^1$ represents a halogen atom or a hydrogen atom, n represents a numeral which satisfies the expression: $0 \leq n \leq a$, and a represents a valence of A, and contacting the resulting particles with a compound (c) having a functional group containing active hydrogen or a non-proton donative Lewis basic functional group, and an electron-withdrawing group.

8. A process for producing an olefin polymer, which comprises polymerizing an olefin in the presence of a catalyst for olefin polymerization obtained by contacting modified particles (A) with a transition metal compound (B) and an organometallic compound (C), wherein the modified particles (A) obtained by contacting particles (a) with a metal compound (b) selected from the group consisting of compounds of the Groups VI, VII and XIV metal elements and compounds of the lanthanide series, and contacting the resulting particles with a compound (c) having a functional group containing active hydrogen or a non-proton donative Lewis basic functional group, and an electron-withdrawing group.

9. A process for producing an olefin polymer, which comprises polymerizing an olefin in the presence of a catalyst for olefin polymerization obtained by contacting modified particles (A) with a transition metal compound (B) and an organometallic compound (C), wherein the modified particles are obtained by contacting particles (a) with a metal compound (b) represented by the general formula (1):

$$R^1_n AX^1_{a-n} \tag{1}$$

wherein A represents an atom of the Group VI elements, the Group VII elements, the Group XIV elements or the lanthanide series in the Periodic Table of the Elements (1993, IUPAC), $R^1$ represents a hydrocarbon or a hydrocarbon oxy group, $X^1$ represents a halogen atom or a hydrogen atom, n represents a numeral which satisfies the expression: $0 \leq n \leq a$, and a represents a valence of A, and contacting the resulting particles with a compound (c) having a functional group containing active hydrogen or a non-proton donative Lewis basic functional group, and an electron-withdrawing group.

10. The process for producing an olefin polymer according to claim 9, wherein said A is a metal atom selected from the group consisting of a samarium atom, chromium atom, manganese atom and tin atom.

11. The process according to claim 5, wherein said olefin is a mixture of ethylene and α-olefin.

12. The process according to claim 6, wherein said olefin is a mixture of ethylene and α-olefin.

13. The process according to claim 7, wherein said olefin is a mixture of ethylene and α-olefin.

14. The process according to claim 8, wherein said olefin is a mixture of ethylene and α-olefin.

15. The process according to claim 9, wherein said olefin is a mixture of ethylene and α-olefin.

16. The process according to claim 10, wherein said olefin is a mixture of ethylene and α-olefin.

* * * * *